Patented Jan. 24, 1933

1,894,959

UNITED STATES PATENT OFFICE

GEORGE JAMES MANSON, OF HAWKESBURY, ONTARIO, CANADA, ASSIGNOR, BY MESNE ASSIGNMENTS, TO MANSON CHEMICAL COMPANY, OF MONTCLAIR, NEW JERSEY, A CORPORATION OF NEW JERSEY

METHOD OF WATERPROOFING FIBROUS PRODUCTS

No Drawing. Original application filed July 8, 1926, Serial No. 121,261. Divided and this application filed April 25, 1927. Serial No. 186,601.

This invention relates to improvements in methods of waterproofing fibrous products, and the objects of the invention are to provide an effective method of waterproofing such products during the process of manufacture thereof.

The method makes use of an emulsion of a water repellent substance prepared as described in my co-pending application Serial No. 121,261, filed July 8th, 1926, of which the present application is a division.

In emulsions of the character to which this invention refers, it is desirable that the emulsions when formed, should be freely diluted with water, and to this end that the individual particles of wax should be thinly coated with the emulsifying medium so that their bulk will not be unduly increased, and the particles remain in discrete form without any tendency to tackiness. I have found that it is possible to form a thin but sufficient coating about the particles of wax by forming a gel in the emulsified mixture rather than by adding a pre-formed emulsified agent thereto.

Such a gel may be formed by a variety of compounds as for example by combining a water soluble acid salt with a silicate, the reacting of which is preferably caused to take place while being mixed with the molten wax while the whole mass is agitated and/or in rapid motion.

Of water soluble electrolytes which may be used, I may mention magnesium chloride, magnesium sulphate, aluminum sulphate, calcium chloride, or other electrolytes of a similar nature. Sodium silicate may be conveniently used as the silicate to form the gel or gelatinuous coating material. The method is applicable to wax which may be animal, mineral or vegetable wax, as well as to the emulsification of these ingredients with themselves or with wax.

In practicing the method, the wax or other water repellent material is melted and mixed with water containing in solution the sodium silicate. The solution of an electrolyte or electrolytes is then added, of the character above described, and the mixture stirred, the temperature being above the melting point of wax or water repellent substance, whereby the gel formed in the mixture will form an insoluble encysting coating about the particles of wax for other water repellent substance to maintain the wax or water repellent substance in discrete form when the mixture cools.

The following may be taken as practical examples of methods of making the emulsion:

Example I 100 pounds of Montan wax (a water repellent substance) is melted and 8 pounds of sodium silicate (a water soluble substance) is added in 120 pounds of water; this solution is heated to about 10° above the melting point of Montan wax; the mixture of melted Montan wax and the solution of sodium silicate is then rapidly stirred and 4½ pounds of magnesium sulphate (a water soluble material) dissolved in 40 pounds of water is added. An encysting gel is immediately formed about the particles of Montan wax, keeping them from coalescing together when the mixture cools. It will be seen that by this means the wax is maintained in a finely divided state and in a condition which enables it to be readily disseminated through any material with which it is to be used.

Example II

| | Per cent |
|---|---|
| Paraffin wax | 33.0 |
| Silicate of soda—plus—(65% of the total water) | 4.0 |
| Alum—plus—(35% of the total water) | 2.0 |
| Glue—(added to silicate of soda) | 1.0 |
| Water | 60.0 |

The silicate of soda is added to the melted wax in a disintegrator and the alum is added after thorough agitation. Working temperature 170° F.

*Example III*

| | Per cent |
|---|---|
| Paraffin wax | 32.5 |
| Montan—(melted with wax) | 0.85 |
| Silicate of soda—plus—(65% of the total water) | 5.0 |
| Alum — plus — (85% of the total water) | 2.75 |
| Glue—(added to silicate of soda with 1% phenol based on glue) | 0.4 |
| Water | 58.5 |

The silicate of soda is added to the melted wax in a disintegrator and the alum is added after thorough agitation. Working temperature 170° F.

*Example IV*

| | Per cent |
|---|---|
| Paraffin wax | 31.0 |
| Montan—(melted with wax) | 7.0 |
| Silicate of soda—plus—(65% of the total water) | 2.65 |
| Alum — plus — (85% of the total water) | 1.35 |
| Water | 58.0 |

The silicate of soda is added to the melted wax in a disintegrator and the alum is added after thorough agitation. Working temperature 170° F.

The mixture or emulsion may be used to waterproof paper or textile materials. In waterproofing paper, the mixture may be added to the beater with or without waterproofing agents, and coagulating agents. Alum, for instance, may be added to complete any coagulating effect required. Owing to the peculiar modifying qualities of the encasing or encysting mineral precipitate on the wax particle (which may be attributed to the method of forming the wax dispersion) so great a proportion of alum as is customarily employed with, for example, resin size, need not be used in the practice of the preferred form of the present invention.

As many changes could be made in the above construction and many apparently widely different embodiments of my invention, within the scope of the claims constructed without departing from the spirit or scope thereof, it is intended that all matter contained in the accompanying specification shall be interpreted as illustrative and not in a limiting sense.

In companion application 186,603, filed April 25, 1927, entitled Fibrous products there is claimed paper products produced from the paper pulp compositions containing dispersions of water repellent substances which have been dispersed during encasement or encystment of those particles by means of gels formed by double decomposition.

What I claim as my invention is:

1. The method of waterproofing paper which comprises encasing a water-resistant substance with a gel formed by double decomposition while dispersing the water-repellent substance, and introducing the dispersion into paper stock.

2. The method as set forth in claim 1 wherein the dispersion is coagulated.

3. The method of waterproofing paper which comprises forming a dispersion mixture of a silica gel-encysted water-repellent substance and introducing the same into paper stock.

4. The method of waterproofing fibrous products which comprises forming a dispersion of a gel encysted water repellent substance and glue, and introducing the same into paper stock.

5. The method of waterproofing paper which comprises forming a dispersion containing an encysted water repellent substance and glue, and introducing the dispersion into paper stock.

6. The method as hereindescribed which comprises forming a dispersion containing a water repellent substance and glue, and introducing the same into paper stock.

7. The method as hereindescribed which comprises introducing into paper stock, a dispersion containing a water repellent substance and glue.

8. The method as hereindescribed which comprises introducing into paper stock, a dispersion containing a water repellent substance, glue, and a preservative for the glue.

9. The method of producing waterproofed products which comprises agitating an aqueous solution of an electrolyte with a water repellent substance to break up the water repellent substance into finely divided particles carried in said aqueous solution, adding a second electrolyte reactive with the first electrolyte to form a precipitated gel upon the particles of the finely divided water repellent substance whereby the particles of finely divided water repellent substance become encysted in the precipitated gel and dispersed thereby in the aqueous medium, and incorporating said dispersion with paper stock.

10. The process of forming waterproof products which comprises agitating an aqueous solution of an electrolyte with a wax to break up the wax into finely divided particles carried in said aqueous solution, adding a second electrolyte reactive with the first electrolyte to form a precipitated gel upon the particles of the finely divided wax whereby the particles of wax become encysted in the precipitated gel and dispersed thereby in the aqueous medium, and incorporating said dispersion with paper stock.

11. The process of preparing waterproof products which comprises agitating an aqueous solution of an electrolyte with a water repellent substance to break up the water repellent substance into finely divided particles carried in said aqueous solution, adding a second electrolyte reactive with the first electrolyte to form a precipitated gel upon the particles of the finely divided water repellent substance whereby the particles of finely divided water repellent substance become encysted in the precipitated gel and dispersed thereby in the aqueous medium, and incorporating said dispersion with paper stock, and coagulating said dispersion in the paper stock after incorporation therewith.

12. The process of preparing waterproof products which comprises simultaneously dispersing a water repellent substance in an aqueous medium while encysting the dispersed particles of the water repellent substance by means of a gel formed by double decomposition, incorporating said dispersion with paper pulp.

In witness whereof I have hereunto set my hand.

GEORGE JAMES MANSON.